(12) United States Patent
Sonnekalb et al.

(10) Patent No.: US 8,981,932 B2
(45) Date of Patent: Mar. 17, 2015

(54) APPARATUS COMPRISING A PAIR OF AN ALARM CONDITION GENERATOR AND AN ASSOCIATED ALARM CIRCUIT, CHIP CARD, AND METHOD

(71) Applicant: Infineon Technologies AG, Neubiberg (DE)

(72) Inventors: Steffen Sonnekalb, Taufkirchen (DE); Stefan Mangard, München (DE)

(73) Assignee: Infineon Technologies AG, Neubiberg (DE)

( * ) Notice: Subject to any disclaimer, the term of this patent is extended or adjusted under 35 U.S.C. 154(b) by 16 days.

(21) Appl. No.: 13/862,882

(22) Filed: Apr. 15, 2013

(65) Prior Publication Data

US 2014/0306823 A1  Oct. 16, 2014

(51) Int. Cl.
*G08B 21/00* (2006.01)
*G08B 23/00* (2006.01)
*G06F 11/27* (2006.01)

(52) U.S. Cl.
CPC ............... *G08B 23/00* (2013.01); *G06F 11/27* (2013.01)

USPC ............................ 340/540; 711/106; 713/100

(58) Field of Classification Search
CPC ........ G06F 11/27; G06F 21/57; G06F 21/575
USPC ................ 340/540; 711/106, 166; 713/1, 100
See application file for complete search history.

(56) References Cited

U.S. PATENT DOCUMENTS

| 6,119,200 | A | * | 9/2000 | George ........................ 711/106 |
| 7,340,596 | B1 | * | 3/2008 | Crosland et al. .............. 713/100 |
| 2009/0055637 | A1 | * | 2/2009 | Holm et al. ....................... 713/1 |
| 2009/0168843 | A1 | * | 7/2009 | Waters et al. .................. 375/130 |

* cited by examiner

*Primary Examiner* — John A Tweel, Jr.
(74) *Attorney, Agent, or Firm* — Murphy, Bilak & Homiller, PLLC

(57) ABSTRACT

An apparatus includes a pair of an alarm condition generator and an associated alarm circuit and a test circuit. The alarm circuit is configured to generate an alarm signal in response to a detection of an associated alarm condition. The alarm condition generator is configured to generate the associated alarm condition for its associated alarm circuit in response to a reception of a first reset of a first type of reset. The test circuit is configured to receive the alarm signal and the first reset and to generate in response to a reception of both the first reset and the alarm signal a second reset of a second type of reset.

30 Claims, 4 Drawing Sheets

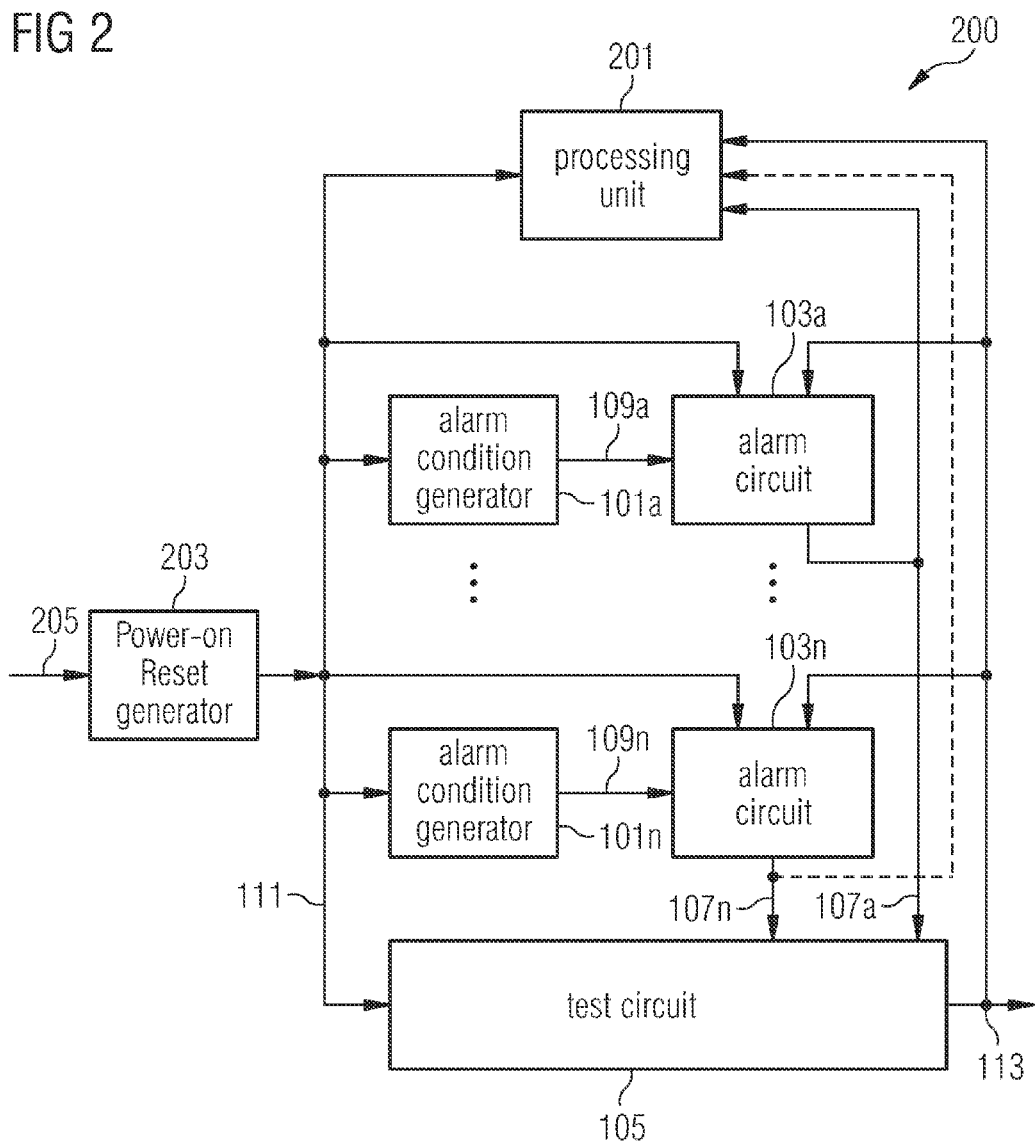

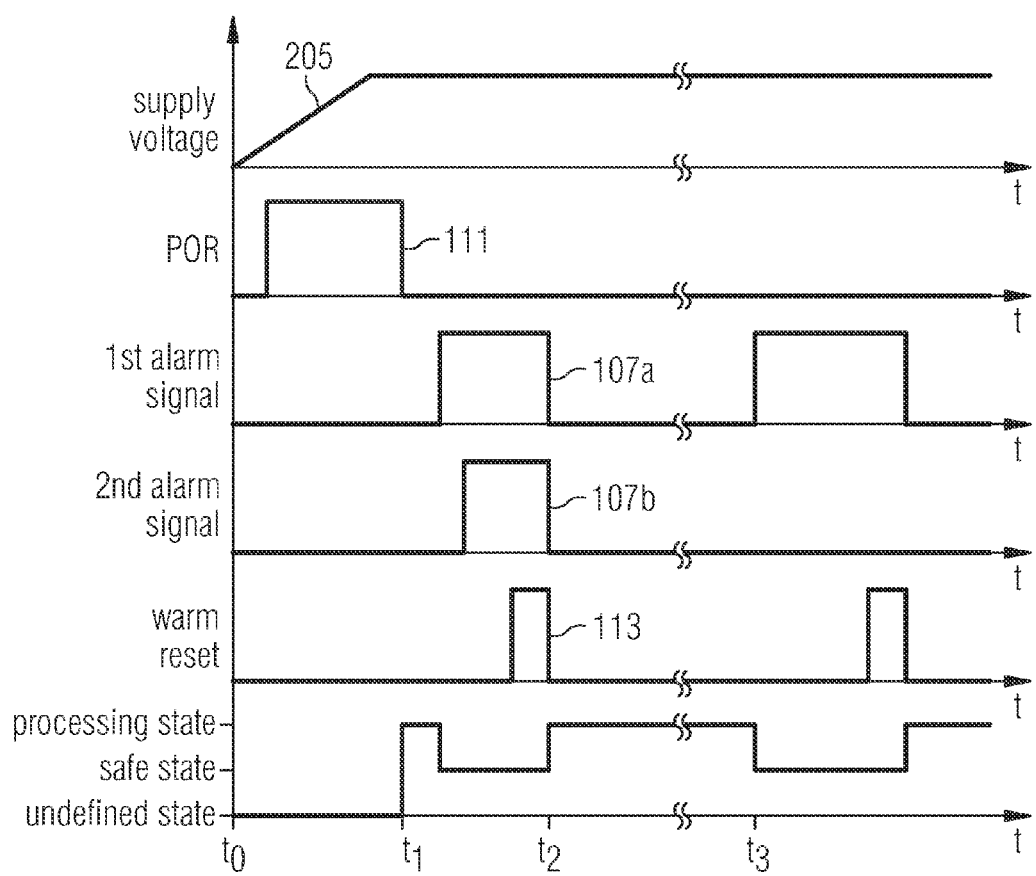

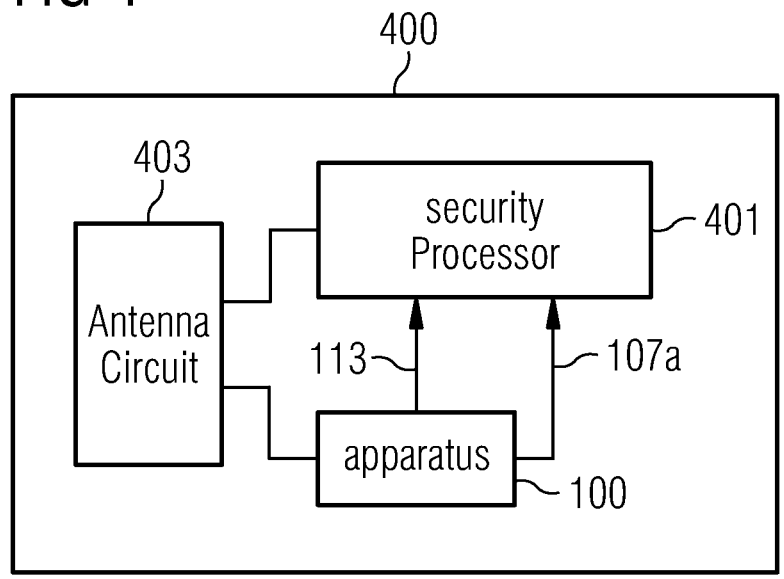
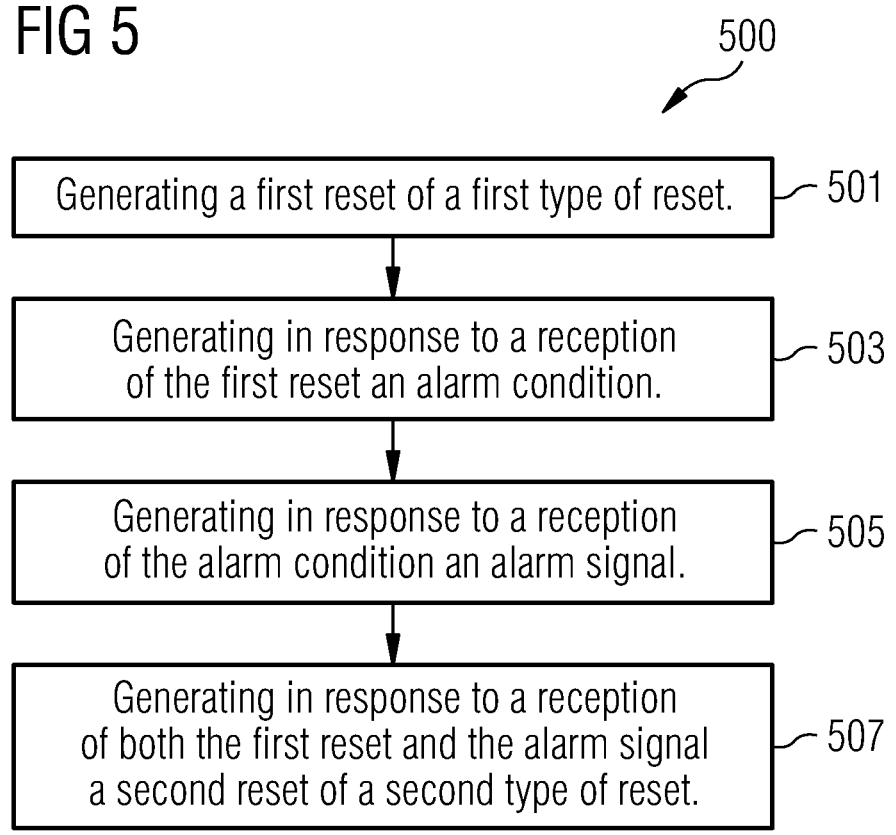

APPARATUS COMPRISING A PAIR OF AN ALARM CONDITION GENERATOR AND AN ASSOCIATED ALARM CIRCUIT, CHIP CARD, AND METHOD

TECHNICAL FIELD

Embodiments relate to an apparatus having an alarm condition generator and an associated alarm circuit, and to a chip card having an alarm condition generator and an associated alarm circuit.

BACKGROUND

The functionality of alarm sources has to be proved on a product and furthermore has to be constantly checked in the field.

Conventional solutions implement tests for alarms in hardware and/or in software. Disadvantages of these implementations are that the tests can be performed only after the chip is completely running and that special circuits are necessary for testing the functionality of the alarms in the different parts of the chips. As an example, there has to be an extra signal which performs a test and a signal which marks during the test that a test is being performed and that the system has to ignore the generated alarm. In this context, it is important to mention that in the case of an alarm often not only an alarm state is signaled but also the generating module activates further mechanisms which ensure that the chip is no longer functional and an alarm has occurred. As an example, a CPU (Central Processing Unit) not only signals the alarm state but also stops a performing of instructions. Such redundancy measures have to be taken separately in the case of a test of the alarm source to ensure that after the test the system can continue to be used.

SUMMARY

Embodiments relate to an apparatus comprising a pair of an alarm condition generator and an associated alarm circuit. The alarm circuit is configured to generate an alarm signal in response to a detection of an associated alarm condition. The alarm condition generator is configured to generate the associated alarm condition for its associated alarm circuit in response to a first reset of a first type of reset. Furthermore, the apparatus comprises a test circuit configured to receive the alarm signal and the first reset and to generate in response to a reception of both the first reset and the alarm signal a second reset of a second type of reset.

Those skilled in the art will recognize additional features and advantages upon reading the following detailed description, and upon viewing the accompanying drawings.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts. In the drawings:

FIG. 2 shows an exemplary implementation of the apparatus of FIG. 1;

FIG. 3 shows timing diagrams for signals and states, how they can occur in the exemplarily implementation of the apparatus shown in FIG. 2;

FIG. 4 shows a chip card according to an embodiment; and

FIG. 5 shows a flow diagram of a method according to an embodiment.

DETAILED DESCRIPTION

Figure 1:
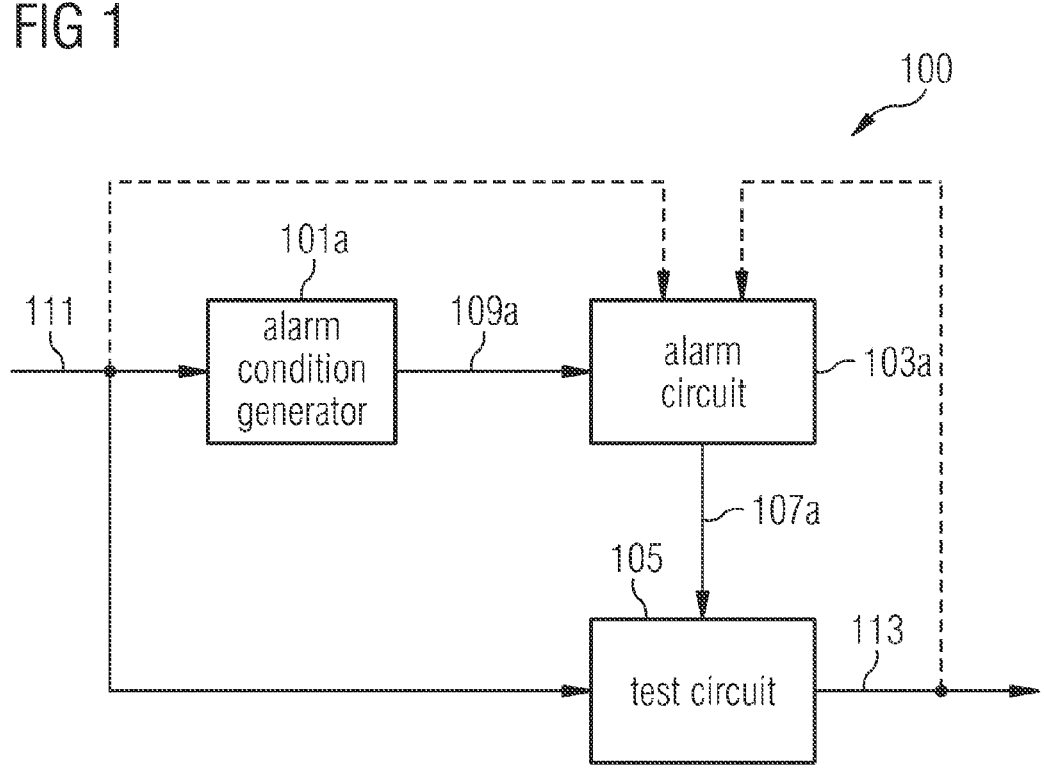
FIG. 1 shows an apparatus according to an embodiment.

Before embodiments of the present invention are described in more detail it is to be pointed out that the same elements or functionally equal elements are provided with the same reference numbers and that a repeated description for elements having the same reference numbers is omitted.

FIG. 1 shows an apparatus 100 according to an embodiment.

The apparatus 100 comprises a pair of an alarm condition generator 101a and an associated alarm circuit 103a. Furthermore, the apparatus 100 comprises a test circuit 105. The alarm circuit 103a is configured to generate an alarm signal 107a in response to a detection of an associated alarm condition 109a. The alarm condition generator 101a is configured to generate the associated alarm condition 109a for its associated alarm circuit 103a in response to a reception of a first reset 111 of a first type of reset. The test circuit 105 is configured to receive the alarm signal 107a and the first reset 111 and to generate in response to a reception of both the first reset 111 and the alarm signal 107a a second reset 113 of a second type of reset.

In the apparatus 100 the two different types of resets (the first type of reset and the second type of reset) can be used to switch between a use mode of the apparatus 100 and a test mode for testing the alarm circuit 103a. Hence, the first reset 111 is used to generate the alarm condition 109a by the alarm condition generator 101a. This alarm condition 109a is detected by the alarm circuit 103a and the alarm circuit 103a generates in response to the detection of this alarm condition 109a the alarm signal 107a. If now the test circuit 105 receives both the first reset 111 and the test signal 107a it generates the second reset 113, which for example can be used to start a normal use mode of the apparatus 100. In other words, the apparatus 100 can be brought into the test modus for testing the alarm circuit 103a based on the generation of the first reset 111 and can be switched to the use mode of the apparatus 100 based on the generation of the first reset 111 and the alarm signal 107a. Hence, the test circuit 105 generates the second reset signal 113, for example, only when the test of the alarm circuit 103a was successful (i.e. if the alarm circuit 103a generated the alarm signal 107a in response to the alarm condition 109a).

Hence, it can be achieved that in response to the generation of the first reset 111 the alarm circuit 103a generates its alarm signal 107a without having the knowledge that the alarm circuit 103a is currently tested and the alarm condition 109a is generated by the alarm condition generator 101a and not by the error or fault condition in the apparatus 100.

Hence, the alarm circuit 103a does not need to include a special test mode or a test circuit, as for the alarm circuit 103a the alarm condition 109a "seems to be" the result of an error in the apparatus 100. Furthermore, by having the test circuit 105 which generates the second reset 113 in response to a reception of both the first reset 111 and the alarm signal 107a it can be achieved that the chip 100 only starts if the alarm circuit 103 has been successfully tested and becomes active by means of the second reset 113. Hence, the apparatus 100 can perform a test of the alarm circuit 103a by using normal reset mechanisms for switching between a test of the alarm circuit 103a and a use mode of the apparatus 100. This simplifies the design and eliminates the need for mechanisms for switching between a test mode and a use mode of the apparatus 100.

As an example, the reset 111 could be a power-on reset 111. By having the first reset signal 111 being a power-on reset 111 it can be achieved that the alarm circuit 103a (and furthermore other alarm circuits of the apparatus 100) can be automatically tested before ramping up a complete functionality of the apparatus 100. In contrast to the power-on reset 111, the second reset 113 can be a warm reset (which is a reset which can be performed even if a supply voltage of the apparatus 100 is constant).

In the example, the ramping up of the apparatus 100 can be performed as the following:

First the power-on reset 111 is generated which brings the apparatus 100 into the test mode for testing the alarm circuit 103a. In response to the power-on reset 111 the alarm condition generator 101a generates the alarm condition 109a and the alarm circuit 103a is tested. If the test circuit 105, after it has received the power-on reset 111, now also receives the alarm signal 107a, then the test of the alarm circuit 103a was successful and the test circuit 105 generates the warm reset 113 and the apparatus 100 ramps up with the alarm circuit 103a being already tested. From this it can also be seen that it can be achieved that the apparatus 100 only ramps up if the test of the alarm circuit 103a was successful, as the test circuit 105 generates the second reset 113 in response to a reception of both the power-on reset 111 and the alarm signal 107a. Hence, if the test circuit 105 does not receive the alarm circuit 107a the test circuit 105 does not generate the warm reset 113 and therefore it can be prevented that the apparatus 100 ramps up.

As an example, the circuit 105 could be configured to bring the apparatus 100 into a safe state, if upon reception of the power-on reset 111, it does not receive the alarm signal 107a within a given delay time from the reception of the power-on reset 111.

A further example on how the apparatus 100 can be brought into a safe state or locked state using a plurality of alarm circuits will be described later on with FIG. 2.

Furthermore, the test circuit 105 can be configured to, after a reception of the first reset 111 wait until it receives the first alarm signal 107a before it generates the second reset 113. Or in other words, the test circuit 105 can be configured to omit generating after reception of the first reset 111, the second reset 113, if it does not receive the alarm signal 107a. Hence, if the test of the alarm circuit 103a fails, the test circuit 105 omits generating the second reset 113 and can therefore prevent a ramping up of the apparatus 100.

Furthermore, the test circuit 105 can be configured to, after the generation of the second reset 113 and upon reception of the alarm signal 107a again without having received the first reset signal 111 again, provides the second reset signal 113 anew. This described mechanism ensures that after the test of the alarm circuit 103a has been performed and the apparatus 100 is running in a normal use mode, alarm conditions (which are not generated by the alarm condition generator 101a) can be treated as desired and lead to the generation of the second reset 113 and therefore to a reset of the apparatus 100. In other words, after the test of the alarm circuit 103a has been performed the test circuit 105 generates the second reset 113 in response to a reception of an alarm signal 107a of the alarm circuit 103a, the alarm circuit 107a indicating a real alarm condition which was not generated by the alarm condition generator 101a.

Furthermore, as can be seen from FIG. 1, the alarm circuit 103a can be configured to receive the second reset 113. As an example, the alarm circuit 103a can be configured to, upon detection of the alarm condition 109a (or in general an alarm condition associated to the alarm circuit 103a) enter an alarm state. Such an alarm state can, for example, lead to a locking of a processing unit of the apparatus 100. Furthermore, the alarm circuit 103a can be configured to, upon reception of the second reset 113 leave the alarm state and enter a detection state for detecting the associated alarm condition 109a (which has been generated by the alarm condition generator 101a or by a fault condition in the apparatus 100).

By having the alarm circuit 103a switching from the alarm state to the detection state after the reception of the second reset 113 it is ensured that after testing the alarm circuit 103a using the generated alarm condition 109a the alarm circuit 103a is active and can detect fault conditions in the apparatus 100 and can generate the alarm signal 107a if it detects its associated alarm condition in the apparatus 100 which was caused by a fault condition in the apparatus 100.

Such fault conditions which can be detected by the alarm circuit 103a may be signals provided by light sensors, temperature sensors, spike sensors, error detection code circuits, parity checkers, result comparators of redundant logic.

In chip cards often redundancy is used to provide integrity protection. E.g. data is duplicated or protected with an error detection code. The consistency of the redundancy and the actual data is checked at several points in the circuit by a comparator.

If there is an inconsistency detected, an alarm is triggered. Hence, the alarm condition is that there is inconsistency in the data in coding and as a consequence there is a comparator output that indicates this inconsistency.

Hence, the alarm circuit can comprise a comparator configured to compare at least two signals and the alarm condition is that the two signals compared by the comparator match (or don't match).

Furthermore, the alarm circuit 103a can be configured to receive the first reset and to, upon reception of the first reset 111, enter the detection state for detecting the associated alarm condition. As for the alarm circuit 103a there is no difference between the alarm condition 109a generated by the alarm condition generator 101a and an alarm condition generated due to a fault or error condition in the apparatus 100, the detection state which the alarm circuit 103a enters after receiving the first reset 111 is the same detection state which the alarm circuit 103a enters after reception of the second reset 113. In other words, the alarm circuit 103a can be configured to receive both the first reset 111 and the second reset 113 and to not distinguish between the first reset 111 and the second reset 113.

Furthermore, the alarm condition generator 101a can be configured to generate the alarm condition 109a only in response to the first reset 111 but not in response to the second reset 113. By having this mechanism it can be ensured that the alarm condition 109a generated by the alarm condition generator 101a (i.e. the false alarm) is only generated after the reception of the first reset 111 and not after the reception of the second reset 113. As an example, in the case of the first reset 111 being a power-on reset 111 the alarm condition generator 101a generates the alarm condition 109a only once after the application of a supply voltage to the apparatus 100.

Further optional features of the apparatus 100 will be described in the following using the exemplary implementation of the apparatus 100 shown in FIG. 2. The apparatus 100 shown in FIG. 1 can be extended by one or more of the features described in the following.

FIG. 2 shows an apparatus 200 which is an exemplary implementation of the apparatus 100 shown in FIG. 1.

The apparatus 200 comprises the test circuit 105 and a plurality of pairs of an alarm condition generator 101a to 101n and an associated alarm circuit 103a to 103n. Each alarm condition generator 101a to 101n is configured to, upon reception of the first reset 111, generate an associated alarm condition 109a to 109n (e.g. an associated false alarm 109a to 109n) in response to which the alarm circuit 103a to 103n associated to the alarm condition generator 101a to 101n generates an alarm signal 107a to 107n. In other words, the apparatus 200 comprises a plurality of pairs of the alarm condition generator 101a and the alarm circuit 103a shown in FIG. 1. The alarm conditions 109a to 109n in response to which the alarm circuits 103a to 103n generate their alarm signals 107a to 107n can differ for different alarm circuits 103a to 103n.

Furthermore, the apparatus 200 comprises a processing unit 201 and a power-on reset generator 203.

The processing unit 201 is configured to receive at least one of the alarm signals 107a to 107n generated by the alarm circuits 103a to 103n. Upon reception of such an alarm signal 107a to 107n the processing unit 201 can enter a safe state or a locked state in which it stops performing its (e.g. security critical) processes.

In other words, the generation of one of the alarm signals 107a to 107n can lead to a locking of the processing unit 201, for example, to prevent a malfunction or to protect the processing unit 201 from a security attack.

Especially in the case in which the processing unit 201 receives more than one of the alarm signals (for example two different alarm signals 107a, 107n generated from two different alarm circuits 103a, 103n) it can be achieved that the processing unit 201 automatically enters the safe state if a test of one of the alarm circuits 103a to 103n failed. As an example, the test circuit 105 can be configured to generate the second reset 113 in response to reception of all of the first reset 111 and the alarm signals 107a to 107n of each of the alarm circuits 103a to 103n and to otherwise (for example, if it receives not from each alarm circuit 103a to 103n the corresponding alarm signal 107a to 107n) omit generating the second reset 113.

Assuming a case in which the test of a first alarm circuit 103a, i.e. this first alarm circuit 103a did not generate its first alarm signal 107a in response to its alarm condition 109a, the processing unit 201 ramps up in response to the generation of the first reset 111 and enters the safe state as it receives an alarm signal 107n from another alarm circuit 103n which passed the test. However, the first alarm circuit 103a failed the test and did not generate its first alarm signal 107a the test circuit 105 also does not generate the second reset 113 and the processing unit 201 remains in the (locked) safe state.

Hence, it can be seen that the processing unit 201 only starts to work if all alarm circuits 103a to 103n have been successfully tested and are active. As an example, in the case in which every alarm circuit 103a to 103n generated its alarm signal 107a to 107n, the processing unit 201 enters the safe state after reception of at least one of the alarm signals 107a to 107n and remains in this safe state. As the test circuit 105 now receives for each alarm circuit 103a to 103n the associated alarm signal 107a to 107n, the test circuit 105 generates the second reset 113, in response to which the processing unit 201 can leave the safe state and enter a processing state in which it normally performs its functions and/or processes.

To summarize, the processing unit 201 is configured to receive alarm signals 107a to 107n (for example, each alarm signal 107a to 107n or a chosen number of alarm signals 107a to 107n which indicate critical alarm conditions for the processing unit 201). Furthermore, the processing unit 201 is configured to enter a safe state in response to reception of at least one of such alarm signals 107a to 107n. Furthermore, the processing unit 201 is configured to receive the second reset 113 and to, upon reception of the second reset 113, leave the safe state and enter a processing state. Hence, it can be achieved that after the successful test of the alarm circuits 103a to 103n (after which the test circuit 105 generates the second reset 113) the processing unit 201 enters its processing state and starts to perform its (safety critical) functions and/or processes. Furthermore, the processing unit 201 can be further configured to receive the first reset 111 and to, upon reception of the first reset 111, enter the processing state.

As an example, assuming the first reset 111 is a power-on reset 111. After applying a supply voltage to the apparatus 200 and after the processing unit 201 has received the power-on reset 111 the processing unit 201 starts in its processing state, but due to the test of the alarm circuits 103a to 103n enters "very soon" the safe state, as a plurality of alarm signals 107a to 107n are generated in the apparatus 200. As for the alarm circuits 103a to 103n, the processing unit 201 also does not distinguish between the alarm conditions 109a to 109n (the false alarms 109a to 109n) generated by the alarm condition generators 101a to 101n and a real alarm condition generated by a fault or error condition in the apparatus 200. Hence, there is no special handling of the test of the alarm circuits 103a to 103n needed in the processing unit 201.

Furthermore, the processing unit 201 may be configured to enter a safe state after receiving the first (power-on) reset 111 instead of entering the processing state. Hence, when the first alarm signal 107a to 107n is generated by one of the alarm circuits 103a to 103n the processing unit is already in the safe state. In this case the processing unit 201 may distinguish between the first reset 111 and the second rest 113, as the first reset 111 leads to a safe state of the processing unit 201 and the second reset 113 leads to a processing state of the processing unit 201.

Furthermore, the test circuit 105 can be configured such that it is not reset after the generation of the second reset 113. In other words, the functionality of the test circuit 105 can be independent of the second reset 113. The test circuit 105 distinguishes between the first reset 111 and the second reset 113 (in contrast to the alarm circuit 103a to 103n and the processing unit 201 which can be configured such that they do not distinguish between the first reset 111 and the second reset 113). By having the test circuit 105 distinguishing between the first reset 111 and the second reset 113, it can be achieved that the test circuit 105 can distinguish if the alarm signals 107a to 107n are generated in response to the alarm conditions 109a to 109n generated by the alarm condition generators 101a to 101n or in response to alarm conditions occurring because of a fault in the apparatus 200. Hence, for the processing unit 201 and the alarm circuit 103a to 103n there is no difference between the test mode of the apparatus 200, which is performed after the generation of the first reset 111, and a normal use mode of the apparatus 200 into which the apparatus 200 is brought after the generation of the second reset 113 by the test circuit 105.

Furthermore, the test circuit 105 can be configured to generate a plurality of further second resets 113 in response to a plurality of alarm signals 107a to 107n subsequently generated by the alarm circuits 103a to 103n. In other words, after the tests of the alarm circuits 103a to 103n have been performed and the apparatus 200 is running in its normal use mode, the test circuit 105 generates, if it receives at least one of the alarm signals 107a to 107n the second reset 113 (without the need for receiving an alarm signal 107a to 107n from each alarm circuit 103a to 103n) as in this case the test circuit 105 "knows" that the alarm signal received is based on a real fault in the apparatus 200 and not based on an alarm condition 109a to 109n (i.e. false alarm or test alarm) generated by one of the alarm condition generators 101a to 101n.

Furthermore, the power-on reset generator 203 is configured to generate the first reset 111 as a power-on reset 111, as already described, in response to an application of a supply voltage 205 to the apparatus 200. By having the first reset 111 being a power-on reset of the apparatus 200 it can be ensured that for every ramping up of the supply voltage of the apparatus 200 (e.g. for every time the apparatus 200 is started) the alarm circuits 103a to 103n of the apparatus 200 are tested and furthermore, as already described, it can be achieved that the processing unit 201 enters its processing state only if the tests of the alarm circuits 103a to 103n have been successfully performed.

Hence, the apparatus 200 performs a test of all of the alarm sources of the apparatus 200 or alarm circuits 103a to 103n of the apparatus 200 using normal reset mechanisms for switching between the testing of the alarms and the normal use mode of the apparatus or chip 200. This simplifies the design and eliminates the need for extra mechanisms for switching between tests and use modes. Furthermore, it is achieved that the apparatus 200 or the chip 200 only ramps up if all alarm mechanisms (all alarm circuits 103a to 103n) have been tested and are active.

In the apparatus 200 two types of resets are available (the first type of reset and the second type of reset). In the example described in FIG. 2 the first type of reset is a power-on reset which is generated by the power-on reset generator 203 when a (supply) voltage 205 is applied to the apparatus 200. The second type of reset is a warm reset which is provided by the test circuit 105 as the second reset 103. Such a warm reset is a reset which is performed in the apparatus 200 while the supply voltage 205 is constantly applied to the apparatus 200 (for example by an external supply voltage supplier).

These two different types of resets (the first type and the second type) are now used for switching between the use mode of the apparatus 200 and the test mode for the alarms or the alarm circuits 103a to 103n.

In the following the functionality of the apparatus 200 shall be described in more detail using FIG. 3, which shows timing diagrams for the different signals and states of the apparatus 200.

In the first diagram of FIG. 3 the supply voltage 205 is illustrated. In the second diagram the first reset or the power-on reset 111 is illustrated. In the third diagram a first alarm signal 107a is illustrated. In the fourth diagram a second alarm signal 107b is illustrated, and in the fifth diagram the second reset or warm reset 113 is illustrated. In the sixth diagram the different possible states of the processing unit 201 are illustrated. The starting or ramping up of the apparatus 200 happens as described next.

First, the supply voltage 205 is applied to the apparatus 200 which can be seen in the ramping of the supply voltage 205 (e.g. from 0 volt to a given nominal supply voltage value of the apparatus 200). In response to the application of the supply voltage 205 to the apparatus 200 the power-on reset generator 203 generates the power-on reset 111.

During the time in which the power-on reset 111 is active, e.g. until $t_1$, the apparatus 200 is in a reset state, which means it does not perform any functions yet. After the power-on reset 111 has been deactivated (e.g. after the falling edge of the power-on reset 111 at time $t_1$) the apparatus 200 is brought into the test phase for testing the alarm circuits 103a to 103n.

Hence, from FIG. 3 it can be seen that after the generation of the power-on reset 111 the first alarm signal 107a is generated (for example, by the first alarm circuit 103a) and furthermore the second alarm signal 107b is generated by a second alarm circuit 103b.

Furthermore, also the processing unit 201 enters its processing state. Nevertheless, in response to the generation of the first alarm signal 107a the processing unit 201 enters the safe state (as it has received the first alarm signal 107a). After the generation of the power-on reset 111 the test circuit 105 waits until it receives the first alarm signal 107a and the second alarm signal 107b. This can be seen in FIG. 3 by the fact that the warm reset 113 is only generated after both alarm signals (the first alarm signal 107a and the second alarm signal 107b) were generated.

After generation of the warm reset 113 by the test circuit 105 the alarm circuits 103a, 103b are reset (which can be seen by the falling edges of the first alarm signal 107a and the second alarm signal 107b) and furthermore the processing unit 201 is reset (which can be seen by the processing unit 201 entering the processing state) at time $t_2$. Hence, after the warm reset 113 generated by the test circuit 105, the apparatus 200 switches from the test mode to the use mode. To summarize, the apparatus 200 is in the test mode for $t_1 \leq t \leq t_2$ and is in the use mode or processing mode for $t > t_2$.

Hence, after the warm reset 113 triggered the change from the test mode to the use mode, the apparatus 200 is ramped up and can perform its (security critical) processes and functions. Hence, from FIG. 3 it can be seen that all parts of the apparatus 200 which can generate an alarm are coupled to the power-on reset 111 such that they are brought into the alarm state or alarm condition in response to the power-on reset 111. In other words, when switching on the apparatus 200 each alarm source or alarm circuit 103a to 103n generates an alarm and performs all redundancy measures as in a normal alarm case (there is no special treatment of the test cases necessary). The generation of a security reset in response to one of the alarm signals 107a to 107n is interrupted directly before the reset generation by a dedicated switch (the test circuit 105). The test circuit 105 checks if every alarm circuit 103a to 103n signals an alarm (generates its associated alarm signal 107a to 107n).

Only when each alarm circuit 103a to 103n has generated its alarm signal 107a to 107n the test circuit 105 generates the second reset or warm reset 113 or allows the second reset 113 to be generated. In other words, the test circuit 105 is configured to, upon reception of the power-on reset 111, wait until it receives the alarm signal 107a to 107n of each alarm circuit 103a to 103n of the plurality of pairs of the apparatus 200 before it generates the warm reset 113. As an example, if only one of the alarm circuits 103a to 103n does not generate its alarm signal 107a to 107n the test circuit 105 omits generating the warm reset 113 and therefore hinders the apparatus 200 from ramping up and starting its (security critical) processes and functions.

After a successful test of all the alarm circuits 103a to 103n all circuit parts of the apparatus 200 are brought into the use mode and furthermore all redundancy measures are reset (e.g. all alarm circuits 103a to 103n are brought in their detection state in which they detect their associated alarm condition). Hence, the alarm circuits 103a to 103n are configured to, upon reception of the warm reset 113, enter a detection state independent of a current state of the alarm circuits 103a to 103n.

The only circuit part of the apparatus 200 which has knowledge of whether the alarm signals 107a to 107n are generated based on a real alarm or based on the test of the alarms is the global test circuit 105. In rest of the chip (such as in the processing unit 201 and the alarm circuits 103a to 103n) such a differentiation is no longer necessary, which simplifies the design work for the apparatus 200.

Furthermore, in case of real alarm, the test circuit 105 may be configured to generate the second rest 113 as a non-ending reset 113, which can lead to a complete blocking of the apparatus. This non-ending reset 113 may only be reset another first reset 111 (as a power-on-reset).

Furthermore, and as already pointed out, it is achieved by the described procedure that during the ramping up of the apparatus 200 the apparatus 200 only enters its real use mode if all alarm circuits 103a to 103n have been successfully tested and have generated their associated alarm signals 107a to 107n.

This can be seen in FIG. 3 as the processing unit 201 would stay in its safe state if the test circuit 105 would have omitted the generation of the warm reset 113.

Furthermore, FIG. 3 also shows the case in which during the normal use a mode at time $t_3$ a fault condition in the apparatus 200 occurs (which is not a false alarm). This fault condition is detected by the first alarm circuit 103a which generates in response to the detection of this fault condition (which corresponds to the alarm condition associated to the first alarm circuit 103a) its first alarm signal 107a. In response to the generated first alarm signal 107a, the processing unit 201 enters its safe state. Furthermore, redundancy measures can be performed in the processing unit 201 and/or in the alarm circuit 103a. The test circuit 105 also receives this generated alarm signal 107a and generates in response to this alarm signal 107a the warm reset 113 anew.

The generation of the warm reset 113 anew leads to a reset of the processing unit 201 and of all alarm circuits 103a to 103n in the apparatus 200. Hence, it can be seen that the processing unit 201 enters upon reception of the warm reset 113 its processing state and the alarm circuit 103a enters its detection state again.

Hence, it can be seen that there is no special treatment necessary between the test mode and the use mode, as the test circuit 105 and the alarm condition generators 101a to 101n are the only parts in the apparatus 200 which have to distinguish between the test mode and the use mode of the apparatus 200. However, this handling can be easily performed using the described power-on reset 111 and the warm reset 113.

Hence, from FIG. 3 it can be seen that the test circuit 105 is configured to, after the generation of the second reset 113 in response to a reception of the power on reset 111 and the alarm signals 107a to 107n and without receiving the power-on reset 111 again, upon reception of any of the alarm signals 107a to 107n of the plurality of pairs, generate the warm reset 113 anew. To summarize, in the test mode of the apparatus 200 the test circuit 105 generates the warm reset 113 only if it receives from each alarm circuit 103a to 103n the associated alarm signal 107a to 107n and in the use mode of the apparatus 200, the test circuit 105 generates the warm reset 113 if it receives any of the plurality of different alarm signals 107a to 107n.

Furthermore, the resets 111, 113 of the apparatus 200 are nondestructive resets, such that after the generation of the first reset 111 and the second reset 113 the functionality of the apparatus 200 is maintained. Hence, the resets 111, 113 should not be understood as resets, in response to which the apparatus 200 destroys itself (for example by destroying a fuse or applying an overvoltage to a voltage sensitive circuit) but should be understood as resets which bring the apparatus 200 (or at least some circuit parts of the apparatus 200) into a predetermined state. As an example, the processing unit 201 can be configured to, upon reception of the first reset 111 and/or the second reset 113 empty a volatile working memory, reset a program counter and/or a reset of a crypto key or other secret pairs.

The generation of the alarm signals 107a to 107n can vary and depend on the desired application. In the example shown in FIG. 3, the alarm circuits 103a, 103b are configured to set their associated alarm signals 107a, 107b to a predetermined level or logic state and to maintain this level or logic state of the associated alarm signals 107a to 107b until they receive the warm reset 113. Nevertheless, according to further embodiments of the present invention an alarm circuit 103a to 103n can also be configured to generate the alarm signal as a pulse of a predetermined length or as a data signal including detailed information about the detected error condition.

Furthermore, according to further embodiments the warm reset 113 and the power-on reset 111 can be coupled together based on a master slave mechanism, in which the power-on reset 111 is the master and the warm reset 113 is the slave. In other words, the warm reset 113 and the power-on reset 111 can be coupled with each other such that if the power-on reset 111 is generated, the warm reset 113 is also generated. Hence, the warm reset 113 can follow the power-on reset 111 if the power-on reset 111 is generated. Nevertheless, the generation of the warm reset 113 by the test circuit 105 does not lead to the generation of the power-on reset 111, as this power-on reset 111 is only generated in response to an application of a supply voltage to the apparatus 200. In other words, the warm reset 113 can be generated while the power-on reset 111 is not generated.

FIG. 4 shows a chip card 400 according to a further embodiment. The chip card 400 comprises the apparatus 100, but may also comprise any other apparatus according to an embodiment, such as the apparatus 200 shown in FIG. 2.

The chip card 400 comprises a security processor 401. The security processor 400 could be an exemplary implementation of the processing unit 201. The security processor 401 is configured to receive at least the alarm signal 107a and is configured to, upon reception of the alarm signal 107a, enter a locked state in which it stops performing its security critical processes and functions. Furthermore, the security processor 401 is configured to, upon reception of the second reset 113, leave the locked state and enter a processing state (in which it performs its security critical processes and functions).

Of course, the apparatus 100 can be extended by the plurality of alarm condition generators and alarm circuits as described in FIG. 2 and accordingly, the security processor 401 can be configured to receive the plurality of different alarm signals 107a to 107n and to enter the locked state upon reception of any of these alarm signals 107a to 107n.

Furthermore, the chip card 400 can comprise an antenna circuit 403. The antenna circuit 403 can be for example configured to receive an RF signal and/or to provide an RF signal. Such an RF signal may comprise data which is to be transmitted to the security processor 401 or which is to be transmitted from the security processor 401 (for example to a chip card reader communicating with the chip card 400).

Furthermore, the antenna circuit 403 can be configured to provide, based on the received RF signal, a supply voltage such as the supply voltage 205 to the security processor 401 and the apparatus 100. In other words, the chip card 400 can be configured to receive a supply voltage wirelessly (without contact), for example by an electromagnetic coupling.

According to further embodiments, the chip card 400 may comprise (e.g. additionally to the antenna circuit 403 or instead of) contacts for transmitting and/or receiving data signals and/or for receiving the supply voltage.

FIG. 5 shows a flow diagram of a method 500 according to an embodiment. The method 500 can be understood as a method for an automatic test of alarms or alarm circuits after a reset (such as a power-on reset).

The method 500 comprises a step 501 of generating a first reset of a first type of reset.

Furthermore, the method 500 comprises a step 503 of generating in response to a reception of the first reset an alarm condition.

Furthermore, the method 500 comprises a step 505 of generating in response to a reception of the alarm condition an alarm signal.

Furthermore, the method 500 comprises a step 507 of generating in response to reception of both the first reset and the alarm signal a second reset of a second type of reset.

The method 500 can be performed by an apparatus according to an embodiment, such as the apparatus 100 shown in FIG. 1 or the apparatus 200 shown in FIG. 2.

The method 500 may be supplemented by any of the features and functionalities described herein with respect to the apparatus, and may be implemented using the hardware components of the apparatus.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments comprise a data carrier having electronically readable control signals, which are capable of cooperating with a programmable computer system, such that one of the methods described herein is performed.

Generally, embodiments can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Although each claim only refers back to one single claim, the disclosure also covers any conceivable combination of claims.

What is claimed is:

1. An apparatus, comprising:
   a pair of an alarm condition generator and an associated alarm circuit, wherein the alarm circuit is configured to generate an alarm signal in response to a detection of an associated alarm condition and wherein the alarm condition generator is configured to generate the associated alarm condition for its associated alarm circuit in response to a reception of a first reset of a first type of reset; and
   a test circuit configured to receive the alarm signal and the first reset and to generate in response to a reception of both the first reset and the alarm signal a second reset of a second type of reset.

2. The apparatus according to claim 1, wherein the test circuit is configured to, after reception of the first reset, wait until it receives the alarm signal before the test circuit generates the second reset.

3. The apparatus according to claim 1, wherein the test circuit is configured to, after the generation of the second reset and upon reception of the alarm signal again without having received the first reset signal again, provide the second reset anew.

4. The apparatus according to claim 1,
wherein the alarm circuit is configured to, upon detection of the associated alarm condition, enter an alarm state; and
wherein the alarm circuit is configured to receive the second reset and to, upon reception of the second reset, leave the alarm state and enter a detection state for detecting the associated alarm condition.

5. The apparatus according to claim 1,
wherein the alarm circuit is configured to receive the first reset and to, upon reception of the reset, enter a detection state for detecting the alarm condition.

6. The apparatus according to claim 1,
wherein the alarm circuit is configured to receive both, the first reset and the second reset and to not distinguish between the first reset and the second reset.

7. The apparatus according to claim 1,
wherein the alarm condition generator is configured to generate the alarm condition only in response to the first reset but not in response to the second reset.

8. The apparatus according to claim 1, further comprising:
a processing unit configured to receive the alarm signal and to enter, in response to reception of the alarm signal, a safe state.

9. The apparatus according to claim 8,
wherein the processing unit is further configured to receive the second reset and to, upon reception of the second reset, leave the safe state and enter a processing state.

10. The apparatus according to claim 9,
wherein the processing unit is further configured to receive the first reset and to, upon reception of the first reset, enter the processing state.

11. The apparatus according to claim 9,
wherein the processing unit is further configured to receive the first reset and to, upon reception of the first reset, enter the safe state.

12. The apparatus according to claim 1,
wherein the test circuit is not reset after the generation of the second reset.

13. The apparatus according to claim 1,
wherein the test circuit is configured to generate a plurality of further second resets in response to a plurality of alarm signals subsequently generated by the alarm circuit.

14. The apparatus according to claim 1,
wherein the first reset is a power-on reset and the second reset is a warm reset.

15. The apparatus according to claim 14, further comprising:
a power-on reset generator configured to generate the first reset in response to an application of a supply voltage to the apparatus.

16. The apparatus according to claim 1,
wherein the apparatus comprises a plurality of pairs of an alarm condition generator and an associated alarm circuit, wherein each alarm circuit is configured to generate an alarm signal in response to a detection of an associated alarm condition and wherein each alarm condition generator is configured to generate the associated alarm condition for its associated alarm circuit in response to a reception of the first reset;
wherein the pair is one pair out of the plurality of pairs; and
wherein the test circuit is configured to generate the second reset in response to a reception of all the first reset and the alarm signal of each alarm circuit of the plurality of pairs.

17. The apparatus according to claim 16,
wherein the test circuit is configured to, upon reception of the first reset, wait until it received the alarm signal of each alarm circuit of the plurality of pairs before it generates the second reset.

18. The apparatus according to claim 16,
wherein alarm conditions associated to different alarm circuits differ from each other.

19. The apparatus according to claim 16,
wherein the test circuit is configured to, after the generation of the second reset and without receiving the first reset again, upon reception of any of the alarm signals of the plurality of pairs, generate the second reset anew.

20. The apparatus according to claim 16,
wherein the test circuit is configured to, after the generation of the second reset and without receiving the first reset again, upon reception of any of the alarm signals of the plurality of pairs, generate the second reset as a non-ending reset and to clear the non-ending reset after reception of a further first reset.

21. The apparatus according to claim 16,
wherein each of the alarm circuits is configured to receive the second reset and to, upon reception of the second reset, enter a detection state for detecting the alarm condition associated to the alarm circuit, independent of a current state of the alarm circuit.

22. The apparatus according to claim 16, further comprising:
a processing unit configured to receive at least two different alarm signals from at least two different alarm circuits of the plurality of pairs and to enter a safe mode based on the reception of at least one of the two different alarm signals.

23. The apparatus according to claim 1,
wherein the first reset and the second reset are non-destructive resets, such that after the generation of the first reset or the second reset, an overall functionality of the apparatus is maintained.

24. The apparatus according to claim 1,
wherein the alarm circuit comprises a comparator configured to compare at least two signals; and
wherein the alarm condition is that the two signals compared by the comparator match.

25. The apparatus according to claim 1,
wherein the alarm circuit comprises a comparator configured to compare at least two signals; and
wherein the alarm condition is that the two signals compared by the comparator do not match.

26. An apparatus, comprising:
a plurality of pairs of an alarm condition generator and an associated alarm circuit, wherein each alarm circuit is configured to generate an alarm signal in response to a detection of an associated alarm signal and wherein each alarm condition generator is configured to generate the associated alarm condition for its associated alarm circuit in response to a reception of a power-on reset;
a test circuit configured to generate a warm reset in response to a reception of the power-on reset and the alarm signal of each alarm circuit of the plurality of pairs; and
a processing unit configured to receive the alarm signals from the alarm circuits and to enter, based on a reception of at least one of the alarm signals a safe state and to switch, after reception of the warm reset from the safe state to a processing state; and
wherein the test circuit is configured to, after the generation of the warm reset, without having received the power-on reset anew, upon reception of any of the alarm signals of the plurality of pairs generate the warm reset anew.

27. A chip card, comprising:
an apparatus comprising:
- a pair of an alarm condition generator and an associated alarm circuit, wherein the alarm circuit is configured to generate an alarm signal in response to a detection of an associated alarm condition and wherein the alarm condition generator is configured to generate the associated alarm condition for its associated alarm circuit in response to a reception of a first reset of a first type of reset; and
- a test circuit configured to receive the alarm signal and the first reset and to generate in response to a reception of both the first reset and the alarm signal a second reset of a second type of reset.

28. The chip card according to claim 27, further comprising:
- a security processor configured to receive the alarm signal and to, upon reception of the alarm signal, enter a locked state; and
- wherein the security processor is configured to, upon reception of the second reset, leave the locked state and enter a processing state.

29. A method, comprising:
generating a first reset of a first type of reset;
generating in response to a reception of the first reset an alarm condition;
generating in response to a reception of the alarm condition an alarm signal; and
generating in response to a reception of both the first reset and the alarm signal a second reset of a second type of reset.

30. A Non-transitory storage medium having stored thereon a computer program having a program code for performing, when running on a computer, a method comprising:
generating a first reset of a first type of reset;
generating in response to a reception of the first reset an alarm condition;
generating in response to a reception of the alarm condition an alarm signal; and
generating in response to a reception of both the first reset and the alarm signal a second reset of a second type of reset.

* * * * *